(12) United States Patent
Lindau

(10) Patent No.: US 10,280,577 B1
(45) Date of Patent: May 7, 2019

(54) SAND CLEANING TOOL

(71) Applicant: Herman A. Lindau, Huntington, NY (US)

(72) Inventor: Herman A. Lindau, Huntington, NY (US)

(*) Notice: Subject to any disclaimer, the term of this patent is extended or adjusted under 35 U.S.C. 154(b) by 0 days.

(21) Appl. No.: 15/981,405

(22) Filed: May 16, 2018

Related U.S. Application Data

(63) Continuation-in-part of application No. 14/666,681, filed on Mar. 24, 2015.

(51) Int. Cl.
| *E01H 12/00* | (2006.01) |
|---|---|
| *E01H 1/12* | (2006.01) |
| *B07B 1/46* | (2006.01) |
| *A01D 7/00* | (2006.01) |

(52) U.S. Cl.
CPC .............. *E01H 12/00* (2013.01); *A01D 7/00* (2013.01); *B07B 1/46* (2013.01); *E01H 1/12* (2013.01); *E01H 2001/1293* (2013.01)

(58) Field of Classification Search
CPC .. E01H 12/00; E01H 1/12; E01H 1/00; E01H 1/006; E01H 1/1206; E01H 1/00; E01H 2001/1293; A01D 7/00; A01D 11/00; B07B 1/46; B07B 1/02; A01B 1/00
See application file for complete search history.

(56) References Cited

U.S. PATENT DOCUMENTS

| 97,420 A | 11/1869 | Thomas |
|---|---|---|
| 1,014,250 A | 9/1909 | Norman |
| 1,094,161 A | 10/1913 | Mueller |
| 1,095,585 A | 12/1913 | Mack |
| 1,955,997 A | 9/1933 | Yant |
| 3,000,448 A | 9/1961 | Platt et al. |
| 3,146,831 A | 9/1964 | McConnell |
| 3,394,483 A | 10/1965 | Thomas |
| 3,613,802 A | 10/1971 | Carlson et al. |
| 3,863,237 A | 1/1975 | Doerr |
| 3,979,146 A | 9/1976 | Berg |
| 4,190,279 A | 2/1980 | Sguazzin |

(Continued)

FOREIGN PATENT DOCUMENTS

DE    10 2004 015 238 A1    10/2005

OTHER PUBLICATIONS

Heavy Duty Wheeleez Beach Cart, May 23, 2011; http://www.sears.com/wheeleez-heavy-duty-wheeleez-beach-cart/p-SPM4167826301.

(Continued)

*Primary Examiner* — Jamie L McGowan
(74) *Attorney, Agent, or Firm* — Peter A. Hurley; Richard L. Miller

(57) ABSTRACT

Disclosed is a tool for cleaning debris from sand when pulled on the sand by a user which has a sieve and a handle, and which sieve is generally semi-cylindrically shaped, and has a pair of balloon tires rotatably mounted to the frame of the sieve, which tires are mounted colinear with the center of mass of the sieve. The frame of the sieve has a crossbar which is slightly off-center from said open mouth of said sieve, forming openings on either side of the crossbar, and allowing the handle, which is disposed on the crossbar, to effectively and easily rotate the sieve by being offset from the center of mass and center of rotation of the sieve. The handle is offset from the plane of the mouth of the sieve so as to further facilitate rotation and dragging in an in-use or not-in-use manner selectively.

9 Claims, 8 Drawing Sheets

(56) References Cited

U.S. PATENT DOCUMENTS

| | | |
|---|---|---|
| 4,198,720 A | 4/1980 | Matsumoto |
| 4,311,332 A | 1/1982 | Walker |
| 4,635,429 A | 1/1987 | Cornelius |
| 4,635,818 A | 1/1987 | Glass |
| 4,821,500 A | 4/1989 | MacIvergan |
| 4,828,690 A | 5/1989 | Montez |
| D302,059 S | 7/1989 | Sanders |
| 5,110,168 A | 5/1992 | Petrillo |
| 5,205,122 A | 4/1993 | Wong |
| 5,417,044 A | 5/1995 | Russo |
| 5,450,713 A | 9/1995 | Rohde |
| 5,511,841 A | 4/1996 | Allen |
| 5,662,366 A | 9/1997 | Fraske |
| 5,921,596 A | 7/1999 | Sheriff et al. |
| 6,755,476 B2 | 6/2004 | Messinger-Rapport |
| 6,857,479 B2 | 2/2005 | Ohzeki et al. |
| 7,111,741 B2 | 9/2006 | Bramante |
| 8,046,982 B1 | 11/2011 | Schutz |
| 8,056,308 B2 | 11/2011 | Shonnard |
| 8,201,863 B1 | 6/2012 | Konovalov |
| D668,053 S | 10/2012 | Cummings |
| 8,689,533 B2 | 4/2014 | Abughazaleh |
| 8,832,973 B2 | 9/2014 | Gallacci |
| 8,955,893 B1 | 2/2015 | Stern et al. |
| 2005/0045350 A1 | 3/2005 | Roberson et al. |
| 2005/0218044 A1 | 10/2005 | Bramante |
| 2007/0084759 A1 | 4/2007 | Shiao |
| 2016/0281313 A1 | 9/2016 | Lindau |

OTHER PUBLICATIONS

Grate Sand Device volleyballusa.com/Catalog/Accessories/Grate-Sand-Cleaning-Device.html, retrieved Mar. 15, 2015.

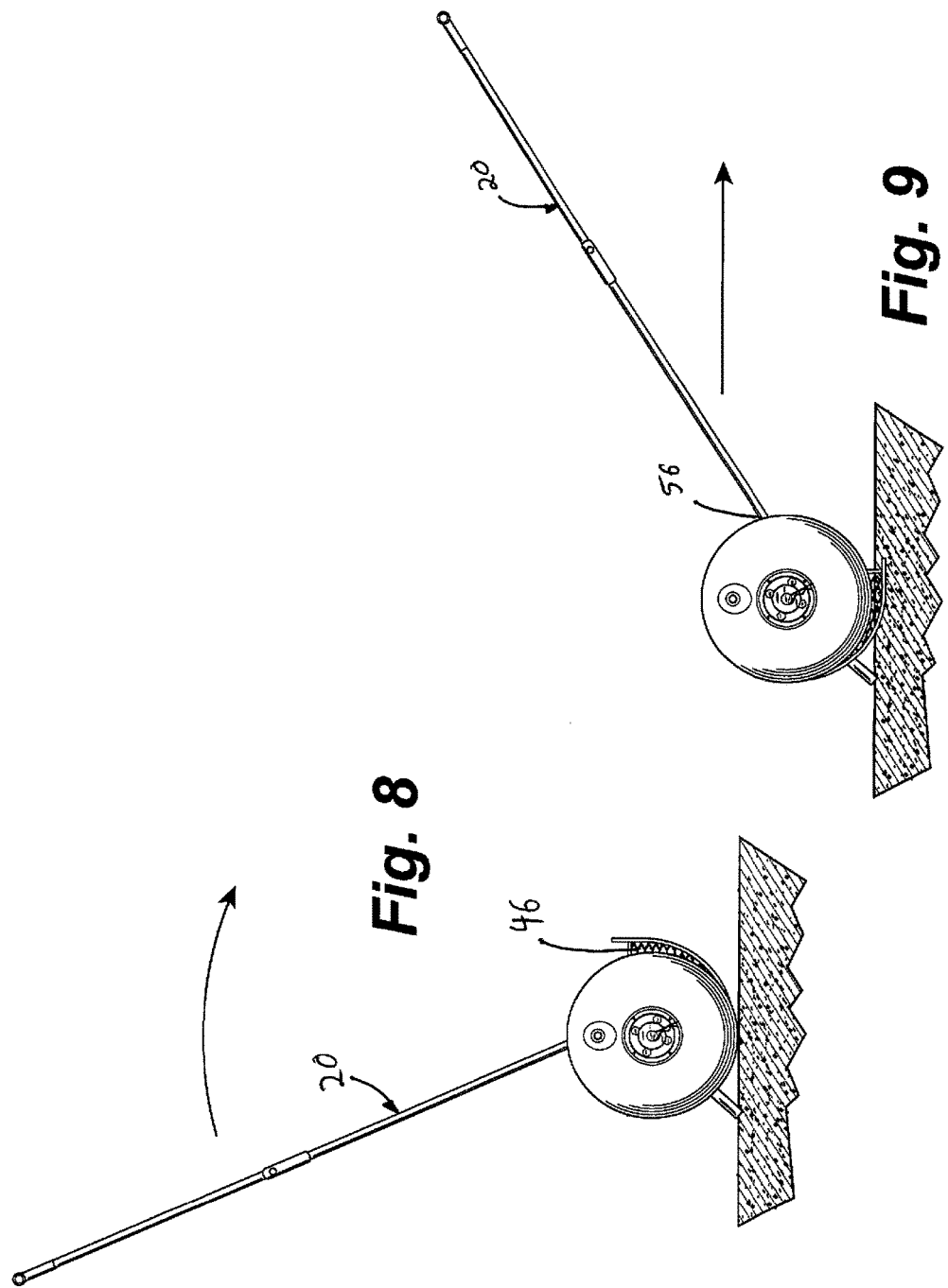

SAND CLEANING TOOL

CROSS REFERENCE TO RELATED APPLICATION

This application is a continuation-in-part of application Ser. No. 14/666,681, Filed Mar. 24, 2015.

BACKGROUND OF THE INVENTION

Field of the Invention

The present invention relates to a cleaning tool, and more particularly, a SAND CLEANING TOOL.

Description of the Prior Art

A FIRST EXAMPLE, U.S. Pat. No. 3,000,448, Issued on Sep. 19, 1961, to Platt, et al. teaches a beach sand cleaning machine including a frame, wheels supporting the frame, a succession of rakes movably carried by the frame and operable to successively enter and continuously comb a strip of the stand along which the machine is advanced, an apparatus for mounting the rakes for movement into the sand and then upwardly to elevate debris separately from the sand, apparatus for actuating the rakes in such movement, and a hopper carried by the frame and positioned to receive the debris elevated by the rakes. The rakes are formed of flexible tines having an essentially comb arrangement and are unencumbered and spaced to pass the sand so that substantially none of the sand is elevated to the hopper. The tines have looped inner portions connected to the mounting apparatus, A SECOND EXAMPLE, U.S. Pat. No. 3,146,831, Issued on Sep. 1, 1964, to McConnell teaches a rake for maintenance of sand traps and putting greens of golf courses. The rake includes a head including an inflexible, reticulate, and generally oblong body portion of substantially concavo-convex shape in cross section. One edge of the concavo-convex body portion is reversely bent to provide an extension terminating in teeth adapted to penetrate and loosen the sand of a stand trap. The sand is rolled, by virtue of the reticulate construction of the body portion, to fluff and level the sand. A handle is fixed to the head. The handle is disposed at such an angle to the head that the terminal teeth of the body portion are substantially vertical to the ground. When the rake is held in position for use in a stand trap, the rake is turned over to effect engagement of the convex portion of the reticulate and oblong body portion with the green. The handle extends upwardly at approximately the same angle for the two different raking operations, thereby facilitating manipulation of the rake by the user.

A THIRD EXAMPLE, U.S. Pat. No. 3,979,146, Issued on Sep. 7, 1976, to Berg teaches a beach cleaning apparatus that includes a generally U-shaped bracket that opens downwardly, a handle attached to the bracket to manually pull the bracket forwardly, an open mesh bag, a fastener mechanism for releasably securing the adjacent parts of the mouth portion of the bag to the bracket, a knife blade extending between the legs of the bracket, and a retainer bar secured to the bracket and knife blade for retaining the lower edge portion of the mouth of the bag therebetween. The mesh of the bag is of a size to permit passage of sand and small stones therethrough, but retain larger objects within the bag.

A FOURTH EXAMPLE, U.S. Pat. No. 4,828,690, Issued on May 9, 1989, to Montez teaches a hand tool having a tapered wedge head, an entrapment mesh supported by a carriage structure and cantilevered from the wedge head, and a handle adjustably coupled to the carriage structure. The tapered wedge head ramps materials, such as sand and soil, into the entrapment mesh. The entrapment mesh is fixed to the carriage structure so that the face and opposed sides of the carriage structure are open. The entrapment mesh is cantilevered from the wedge head to prevent contact of the mesh with the ground.

A FIFTH EXAMPLE, U.S. Pat. No. 5,205,122, Issued on Apr. 27, 1993, to Wong teaches a combination sand rake and shovel providing the ability to clean sandy with a tool having two configurations. When configured as a shovel, the debris may be lifted directly from the sand. When configured as a rake, the debris can be screened in a direction parallel to the grounds surface.

A SIXTH EXAMPLE, U.S. Pat. No. 6,857,479, Issued on Feb. 22, 2005, to Ohzeki, et al. teaches a beach cleaner for recovering waste while moving in a towed state by a traction vehicle. A grating-like portion scoops up waste present in front of the beach cleaner as the beach cleaner is moved and a reticulate portion that is formed behind the grating-like portion to hold waste. As the beach cleaner is moved, waste present in front of the beach cleaner is scooped up onto the grating-like portion and is held with the reticulate portion formed behind the grating-like portion. Sand that is scooped up together with the waste is allowed to drop through the gaps in the grating-like portion.

A SEVENTH EXAMPLE, U.S. Pat. No. 8,689,533, Issued on Apr. 8, 2014, to Abughazaleh teaches a lawn rake or lawn rake attachment providing a capture structure that cooperates with the tines of a lawn rake to increase the collection of small leaves and debris with each stroke of the rake. More specifically, the capture structure provides a broad surface, preferably, spanning the width of the rake and positioned an effective distance trailing behind the rake tine structure. In operation of the lawn rake equipped with the capture structure, during the course of a stroke of the rake the rake tines stir up the small leaves in or on the lawn grass. The stirring-up action propels the leaves a distance up above the ground before they fall back on the rake stroke trail. The trailing rake capture structure intercepts the airborne leaves and holds them at its surface while the rake is in a forward raking motion.

AN EIGHTH EXAMPLE, Article published on Mar. 23, 2011 by Malgari teaches a manual tool to clean sandy areas. The manual tool solves the problem of keeping a sandy home-front clean and safe. One sweep makes either a beach club ready to welcome costumers or an isolated beach clean.

It is apparent now that numerous innovations for sand cleaning tools have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a SAND CLEANING TOOL that avoids the disadvantages of the prior art.

ANOTHER OBJECT of the present invention is to provide a SAND CLEANING TOOL that is simple and inexpensive to manufacture.

STILL ANOTHER OBJECT of the present invention is to provide a SAND CLEANING TOOL that is simple to use.

BRIEFLY STATED, STILL YET ANOTHER OBJECT of the present invention is to provide a SAND CLEANING TOOL that is easy and ergonomic to operate by hand, and which combs sand neatly.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWINGS

The figures of the drawings are briefly described as follows:

FIG. 8 is a diagrammatic side elevational view of the tool before being rotated into a working position;

FIG. 9 is a diagrammatic side elevational view thereof after having been rotated into a working position and ready to clean debris;

Figure 1:
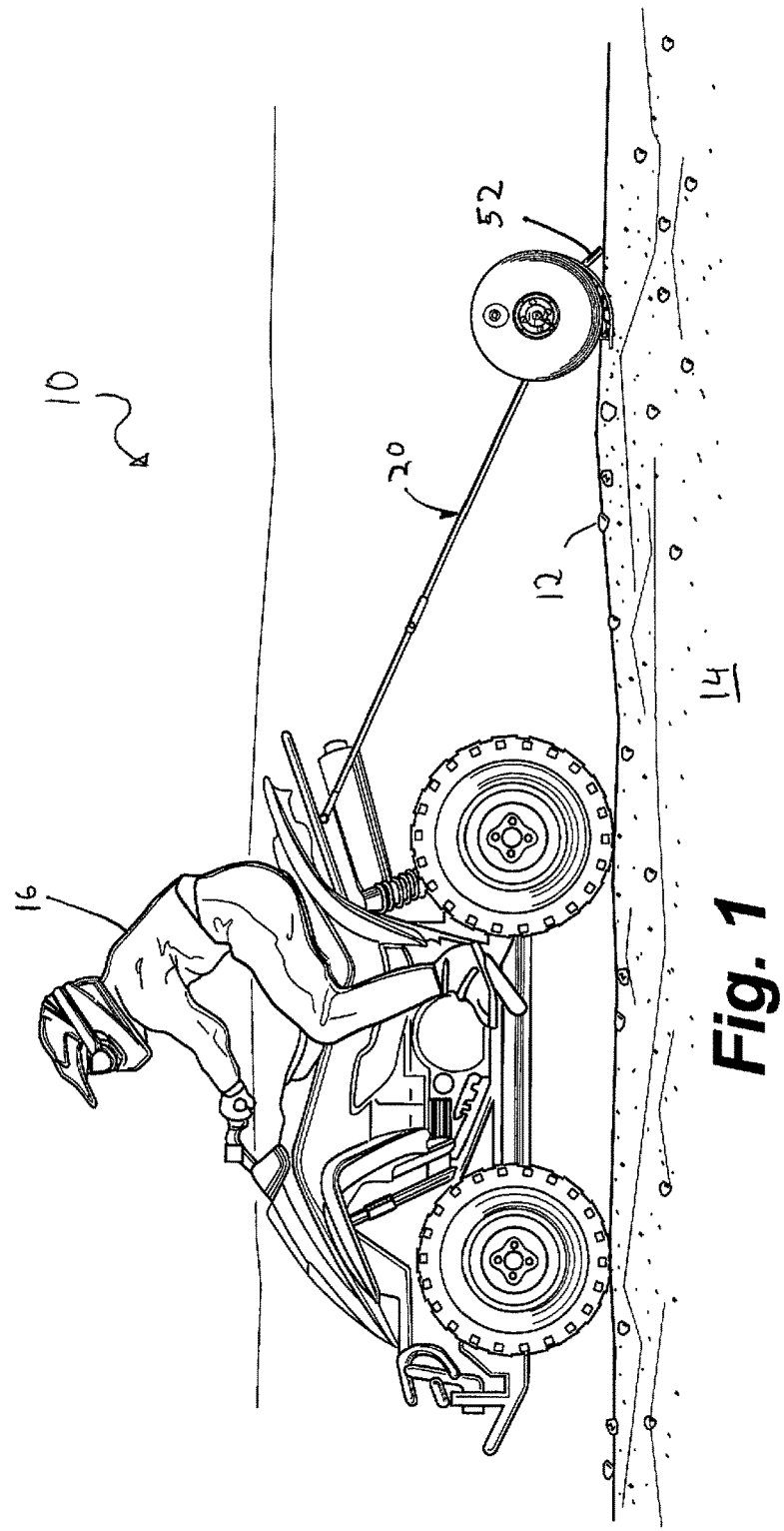
FIG. 1 is a diagrammatic elevational view showing the SAND CLEANING TOOL of the present invention being dragged by a vehicle.

A MARSHALING OF REFERENCE NUMERALS UTILIZED IN THE DRAWINGS 10 sand cleaning tool
12 debris
14 sand
16 user
18 sieve
20 handle
22 frame of sieve 18
24 lateral cross rods of frame 22 of sieve 18
26 mesh of sieve 18
28 U-shaped end rods of frame 22 of sieve 18
32 crossbar of sieve 18
34 vertical end rods of frame of sieve 18
36 pair of wheels
38 balloon tires of pair of wheels 36
40 straight transverse rods of frame 22 of sieve 18
42 open mouth of sieve 18
44 plane of open mouth 42 of sieve 18
45 arm of handle 20
46 side portions of mesh 26 of sieve 18
48 lowermost point of U-shaped end rods 28 of frame 22 of sieve 18
50 center of mass of sieve
52 comb
54 proximal end of handle
56 distal end of handle
58 angle iron material of crossbar 32 of sieve 18
60 pair of arms for attaching comb 52 to sieve 18

DETAILED DESCRIPTION OF THE PREFERRED EMBODIMENT

Figure 3:
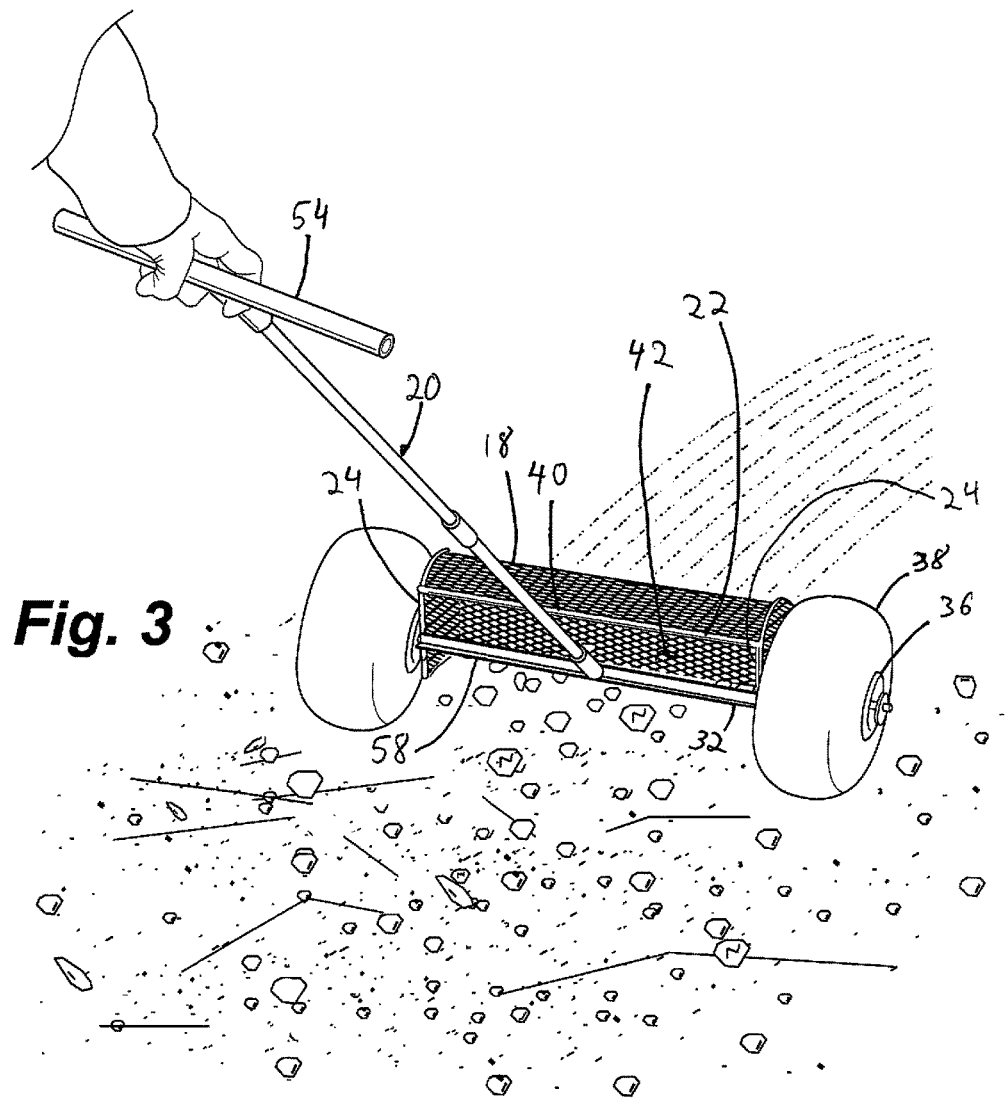
FIG. 3 is an enlarged view of the area enclosed by the circle indicated by arrow 3 in FIG. 2.

Referring now to the figures, in which like numerals indicate like parts, and particularly to FIG. 3 disclosed is a tool 10 for cleaning debris 12 from sand 14 when pulled on the sand 14 by a user 16. The tool includes a sieve 18 and a handle 20. The handle 20 is so positioned on the sieve 18 so as to allow the sieve 18 to have a working position for cleaning the debris 12 from the sand 14 when the tool 10 is pulled on the sand 14 by the user 16 and a non-working position for not cleaning the debris 12 from the sand 14 when the tool 10 is pulled on the sand 14 by the user 16. In this specification the term user means either person and/or vehicle.

This configuration provides an advantage in allowing a simple reorientation of the tool 10 to allow it to be in a working or non-working position and easily be removed from a sandy area without excess effort of dragging it through sand 14.

To structurally accomplish the aforementioned goal, the sieve 18 includes a frame 22. The frame 22 of the sieve 18 has a pair of lateral cross rods 24. The sieve also includes a mesh 26. The frame 22 of the sieve 18 includes a pair of U-shaped end rods 28. The frame 22 of the sieve further includes a crossbar 32. The position of the handle 20 is extending from the crossbar 32 generally away from the sieve 18.

Figure 7:
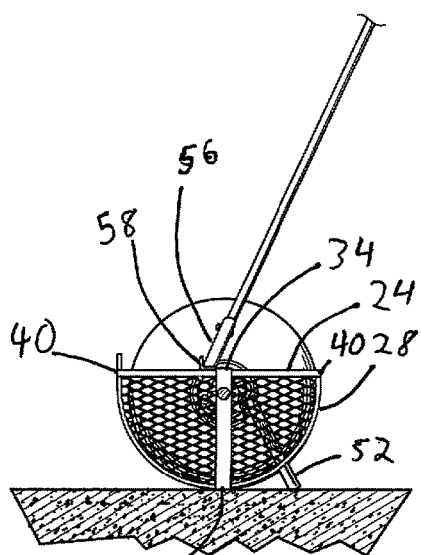
FIG. 7 is a cross sectional view thereof taken on line 7-7 in FIG. 4.

As best illustrated in FIG. 7, the frame 22 further includes a pair of vertical end rods 34. The vertical end rods 34 are at right angles to the lateral cross rods 24. The tool 10 further includes a pair of wheels 36. The pair of wheels 36 are rotatably attached to the pair of vertical end rods 34. In the preferred construction, each wheel 36 of the pair of wheels 36 has a balloon tire 38. The use of balloon tires 38 allows the tires 38 to travel on sand 14 without sinking therein, even when supporting the weight of the tool 10. Mounting the wheels 34 on the vertical end rods 34 and attaching the vertical end rods 34 to the lateral cross rods 24 provides sufficient strength and rigidity for the tool 10 to work.

In order to allow the tool to operate in a working position and a non-working position, the sieve 18 is generally semi-cylindrically shaped. The U-shaped end rods 28 correspond in shape to the semi-cylindrical shape of the sieve 18. This allows them to provide the sieve 18 structural integrity. To further provide structural integrity, the pair of U-shaped end rods 28 of the frame 22 of the sieve 22 are aligned with each other, and the pair of U-shaped end rods 28 of the frame 22 of the sieve 22 are parallel to each other.

The frame 22 of the sieve 18 includes a pair of straight transverse rods 40. The pair of straight transverse rods 40 of the frame 22 of the sieve 18 are aligned with each other. The straight transverse rods 40 of the frame 22 of the sieve 18 are aligned with the crossbar 32. Further, the pair of straight transverse rods 40 of the frame 22 of the sieve 18 are parallel to each other, and the crossbar 32 is parallel with the pair of straight transverse rods 40.

Figure 2:
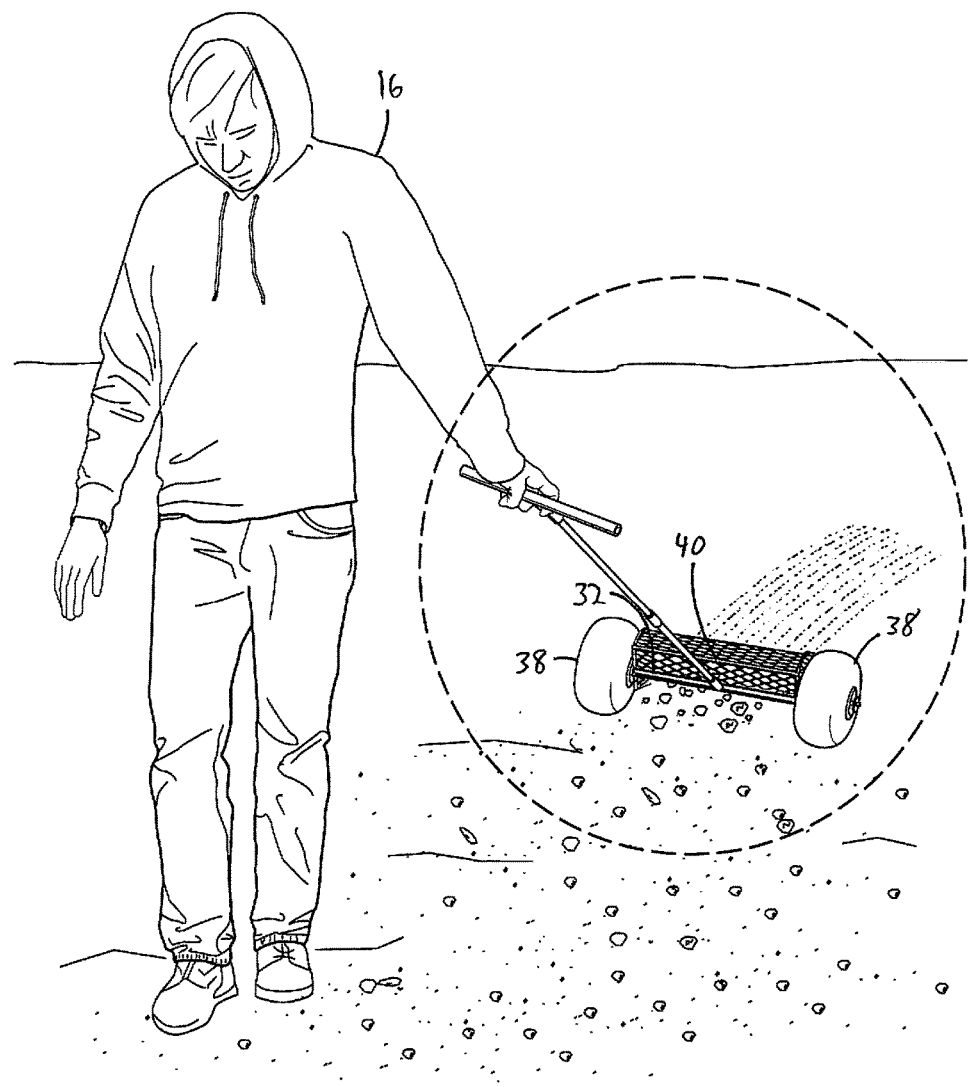
FIG. 2 is a diagrammatic perspective view showing the tool being dragged by a user.

The pair of straight transverse rods 40 of the frame 22 of the sieve 18 are fixedly attached to the pair of lateral cross rods 24 of the frame 22 of the sieve 18, respectively, so as to define therewith an open mouth 42. The open mouth 42 of the sieve 18 is for scooping up the sand 14 with the debris 12 therein when the tool 10 is in the working position thereof and pulled on the sand 14 by the user 16. This is most clearly illustrated in FIGS. 1, 2, and 3.

The crossbar is the only obstruction of the open mouth 42 of the sieve 18. The said crossbar is slightly off-center from the open mouth 42 of the sieve 18, forming openings on either side of the crossbar 32. This configuration faciltates having a working position and a non-working position because it allows a user to pivot the tool 10 by providing an off-center position of force. This works in concert with the handle 20 being offset at an angle by further providing means of leverage.

To that end, the open mouth of the sieve 18 has a plane. The handle 20 is disposed on an arm 43. The handle extends fixedly outwardly from the crossbar 32 of the frame of said sieve so as to offset said handle relative to said plane of said sieve so as to allow transition between said working position of said sieve and said non-working position of said sieve by merely pivoting said handle. In the preferred configuration, the crossbar 32 is formed from angle iron material 58. This configuration is preferred because the angle iron material 58 provides greater strength when rotating between positions for minimal added mass. It is to be understood that the term "angle iron material" 58 refers to any rigid material which has a single right angle for structure, but is not limited to elemental iron. Suitable materials include but are not limited to iron, steel, stainless steel, aluminum, aluminum alloys, and rigid plastics.

The mesh 26 of the sieve 18 includes a pair of side portions 46. The side portions 46 are substantially semi-cylindrically shaped. The U-shaped end rods 28 each have a lowermost point 48. The vertical end rods 34 travel from each of the lowermost points 48 of the U-shaped end rods 28 to the lateral cross rods 30. By this geometry therefore, the vertical end rods 34 travel along the center of the sieve 18 and bisect the side portions 46 of the mesh 26 of the sieve 18.

Like all physical objects, the sieve 18 has a center of mass 50. The location of the rotatable attachment of the pair of wheels 36 to the vertical end rods 34 is colinear with the center of mass 50 of the sieve 18 for both such wheels 36. This provides several advantages. First, it allows the sieve 18 to be pivoted on the wheels 36 more easily because it can rotate freely when its mass is centered. Second, because the sieve 18 has a generally semi-cylindrical shape, the center of mass 50 is offset from the center, allowing the open mouth 42 to be closer to the rotatable attachment of the pair of wheels 36 than the midpoint of the vertical end rods 34. This ensures that the tool 10 will tend not spill out debris 12 when being moved from the working position to the non-working position.

Figures 4, 5:
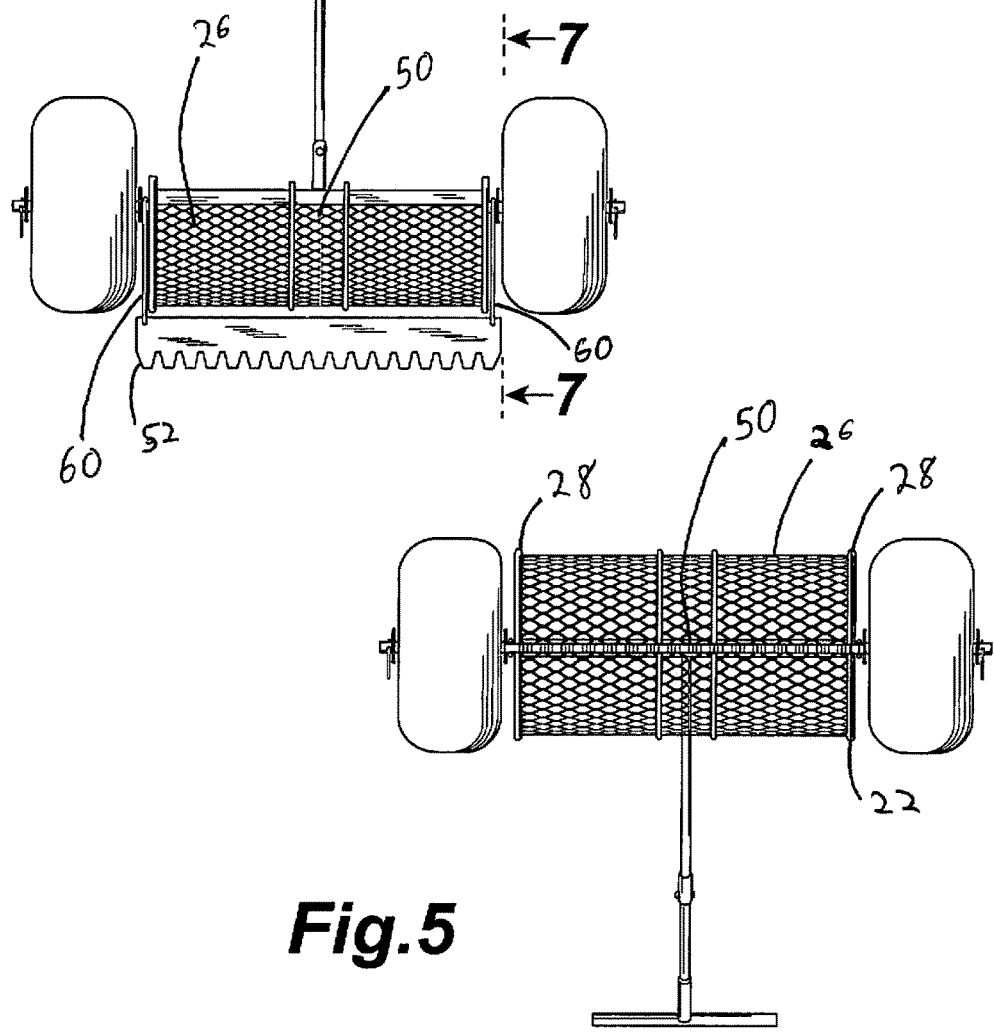
FIG. 4 is a diagrammatic front side elevational view of the tool per se.
FIG. 5 is a diagrammatic bottom side elevational view of the tool per se.
Figure 6:
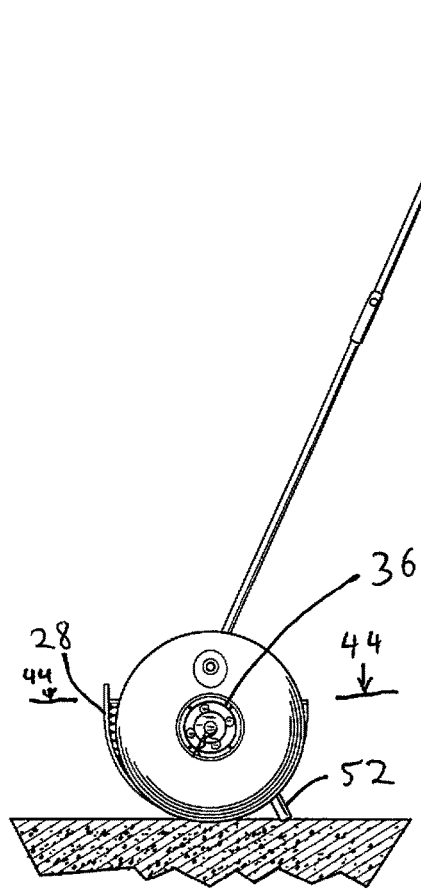
FIG. 6 is a diagrammatic side elevational view of the tool resting on a ground surface.

As best shown in FIGS. 4 and 7, the tool 10 further includes a comb 52. The comb 52 is for combing the sand 14 as the debris 16 is being removed from the sand 14. The comb is rotatably attached by a pair of arms 53 to the frame of the sieve 18 proximally to the point where the pair of wheels 36 are attached to the sieve 18. This configuration allows the comb 52 to work regardless of the relative rotation of the wheels 36 and the sieve 18.

Figure 11:
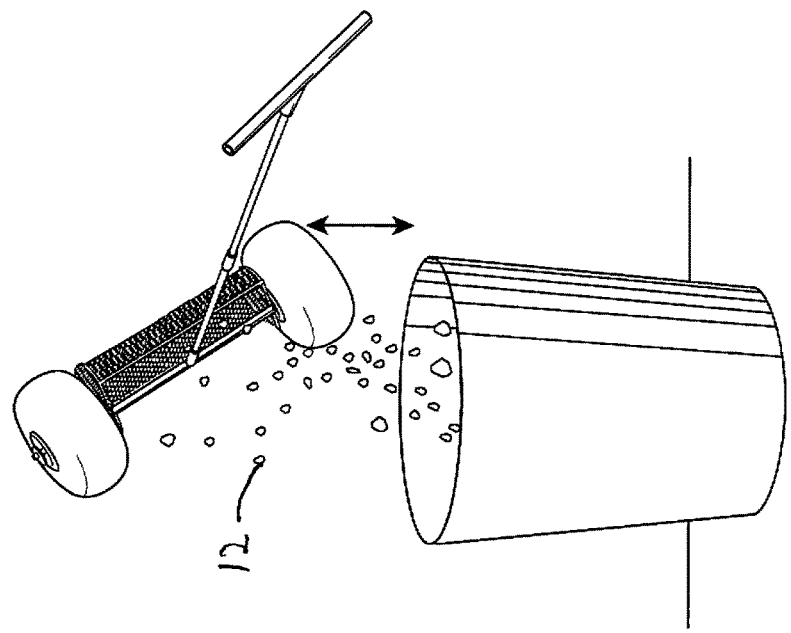
FIG. 11 is a diagrammatic perspective view thereof showing the tool being upended to discard debris gathered by the tool in a receptacle.
Figure 10:
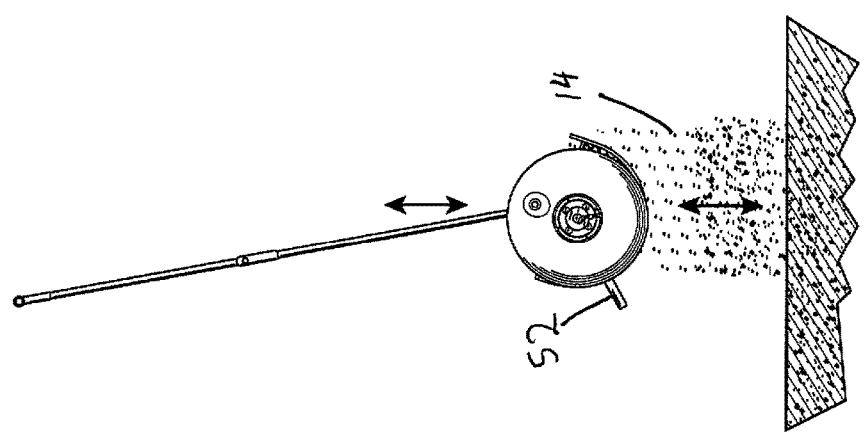
FIG. 10 is a diagrammatic side elevational view thereof showing the tool being shaken to remove sand therefrom while retaining debris.
Figure 12:
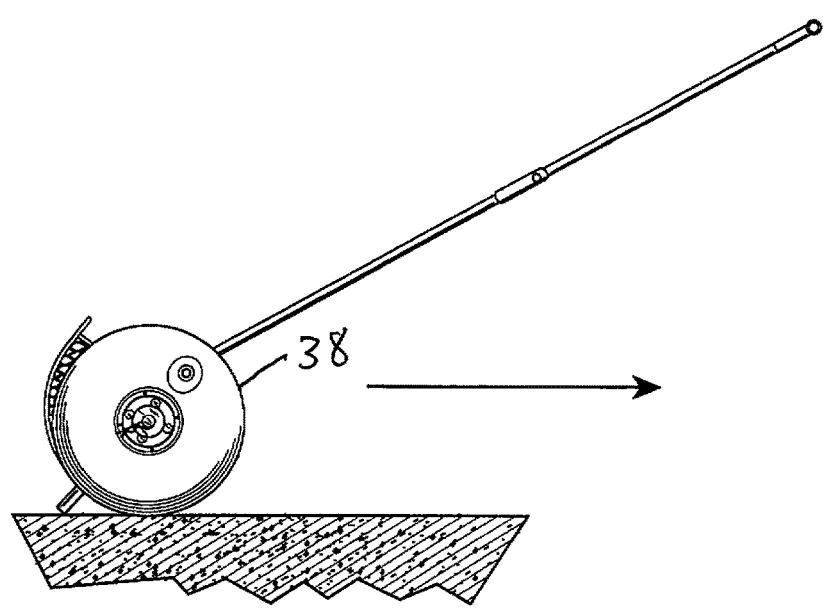
FIG. 12 is a diagrammatic side elevational view thereof showing the tool being used to comb sand without cleaning it.

As best illustrated in FIG. 11, the handle 20 is straight. The handle 20 is slender. The handle 20 is elongated. The handle 20 is telescopic for length adjustment. The handle 20 has a proximal end 54. The handle 20 has a distal end 56. The proximal end 54 of the handle 20 is T-shaped for facilitating gripping the handle 20 by the user 16 when the user pulls the tool 10.

It will be understood that each of the elements described above, or two or more together, may also find a useful application in other types of constructions differing from the types described above.

While the invention has been illustrated and described as embodiments of a SAND CLEANING TOOL, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A tool for cleaning debris from sand when pulled on the sand by a user, comprising:
   a) a sieve; and
   b) a handle;
   wherein said handle is so positioned on said sieve so as to allow said sieve to have a working position for cleaning the debris from the sand when said tool is pulled on the sand by the user and a non-working position for not cleaning the debris from the sand when said tool is pulled on the sand by the user;
   wherein said sieve comprises a frame;
   wherein said frame of said sieve comprises a pair of lateral cross rods;
   wherein said sieve comprises a mesh;
   wherein said frame of said sieve comprises a pair of U-shaped end rods;
   wherein said frame of said sieve comprises a crossbar;
   wherein said position of said handle is extending from said crossbar generally away from said sieve;
   wherein said frame further comprises a pair of vertical end rods;
   wherein said vertical end rods are at right angles to said lateral cross rods;
   wherein said tool further comprises a pair of wheels;
   wherein said pair of wheels are rotatably attached to said pair of vertical end rods;
   wherein each wheel of said pair of wheels has a balloon tire;
   wherein said sieve is generally semi-cylindrically shaped;
   wherein said U-shaped end rods correspond in shape to said semi-cylindrical shape of said sieve;
   wherein said pair of U-shaped end rods of said frame of said sieve are aligned with each other;
   wherein said pair of U-shaped end rods of said frame of said sieve are parallel to each other;
   wherein said frame of said sieve comprises a pair of straight transverse rods;
   wherein said pair of straight transverse rods of said frame of said sieve are aligned with each other;
   wherein said straight transverse rods of said frame of said sieve are aligned with said crossbar;

wherein said pair of straight transverse rods of said frame of said sieve are parallel to each other;

wherein said crossbar is parallel with said pair of straight transverse rods;

wherein said pair of straight transverse rods of said frame of said sieve are fixedly attached to said pair of lateral cross rods of said frame of said sieve, respectively, so as to define therewith an open mouth;

wherein said open mouth of said sieve is for scooping up the sand with the debris therein when said tool is in said working position thereof and pulled on the sand by the user;

wherein said crossbar is the only obstruction of said open mouth of said sieve;

wherein said crossbar is slightly off-center from said open mouth of said sieve, forming openings on either side of said crossbar;

wherein said open mouth of said sieve has a plane;

wherein said handle is disposed on an arm;

wherein said handle extends fixedly outwardly from said crossbar of said frame of said sieve so as to offset said handle relative to said plane of said sieve so as to allow transition between said working position of said sieve and said non-working position of said sieve by merely pivoting said handle;

wherein said mesh of said sieve comprises a pair of side portions;

wherein said side portions are substantially semi-cylindrically shaped;

wherein said U-shaped end rods each have a lowermost point;

wherein said vertical end rods travel from each of said lowermost points of said U-shaped end rods to said lateral cross rods;

wherein said sieve has a center of mass;

wherein the location of said rotatable attachment of said pair of wheels to said vertical end rods is colinear with said center of mass of said sieve for both such wheels;

wherein said tool further comprises a comb;

wherein said comb is for combing the sand as the debris is being removed from the sand; and wherein said comb is rotatably attached by a pair of arms to said frame of said sieve proximally to the point where said pair of wheels are attached to said sieve.

2. The tool of claim 1, wherein said handle is straight.

3. The tool of claim 2, wherein said handle is slender.

4. The tool of claim 3, wherein said handle is elongated.

5. The tool of claim 4, wherein said handle is telescopic for length adjustment.

6. The tool of claim 5, wherein said handle has a proximal end.

7. The tool of claim 6, wherein said handle has a distal end.

8. The tool of claim 7, wherein said proximal end of said handle is T-shaped for facilitating gripping said handle by the user when the user pulls said tool.

9. The tool of claim 8 wherein said crossbar is formed from angle iron material.

* * * * *